United States Patent [19]

Galgon

[11] Patent Number: 4,954,147
[45] Date of Patent: Sep. 4, 1990

[54] WATER CONDITIONING APPARATUS AND METHOD

[75] Inventor: Randy A. Galgon, Nuremberg, Pa.

[73] Assignee: Hazleton Environmental Products, Inc., Hazleton, Pa.

[21] Appl. No.: 366,641

[22] Filed: Jun. 15, 1989

[51] Int. Cl.$^5$ .......................................... B01D 17/038
[52] U.S. Cl. .......................................... 55/53; 55/196; 210/806; 210/808; 261/76; 261/DIG. 75; 366/165; 366/177
[58] Field of Search ...................... 55/53, 94, 196, 223; 210/750, 774, 767, 806, 808, 188, 209; 261/76, 150, 152, DIG. 75; 366/165, 176, 177

[56] References Cited

U.S. PATENT DOCUMENTS

| | | |
|---|---|---|
| 2,579,282 | 12/1951 | Vicard . |
| 2,937,141 | 5/1960 | Helwig . |
| 3,653,182 | 4/1972 | Welch . |
| 3,774,846 | 11/1973 | Schurig et al. .................... 261/76 X |
| 3,954,921 | 5/1976 | Yoshida et al. . |
| 4,019,983 | 4/1977 | Mandt ............................... 261/76 X |
| 4,474,477 | 10/1984 | Smith et al. . |
| 4,487,553 | 12/1984 | Nagata ............................... 261/76 X |
| 4,761,077 | 8/1988 | Werner . |

FOREIGN PATENT DOCUMENTS 2035814 6/1980 United Kingdom .
2038048 7/1980 United Kingdom .

Primary Examiner—Charles Hart
Attorney, Agent, or Firm—Hill, Van Santen, Steadman & Simpson

[57] ABSTRACT

A water conditioning apparatus and method wherein raw water is supplied to a plurality of axially aligned stripping chambers to form a cove shaped sheet within said stripping chambers and to cause an aspiration of air in each of the stripping chambers. Alternating high and low pressure zones are formed in the stripping chambers to enhance the air stripping of the water. The water is discharged through an outlet nozzle where the water sprays against the side wall of the nozzle to cause the water droplets to coalesce.

13 Claims, 2 Drawing Sheets

WATER CONDITIONING APPARATUS AND METHOD

BACKGROUND OF THE INVENTION

This invention relates to a novel method and apparatus for obtaining near complete mass transfer of volatile compounds between liquid and gas phase adapted to the removal of contaminants from water by air stripping.

Current methods and apparatus used to effect the air stripping of compounds from liquids are packed or tray stripping tower technology, surface aerators, injection aerators and the new technology of aspirated strippers based on hydraulic jet principles.

Stripping towers are expensive capital investments, have a narrow performance band commonly requiring control to prevent flooding and are affected by biological fouling, plugging by precipitated or suspended solids and cold weather.

Surface aerators generate mist, require large land areas, are affected by cold weather and can only treat contaminated water where the off gas does not have to be collected.

Aeration by injection through diffusers or in-well spargers is expensive to operate and subject to diffuser fouling.

Aspiration stripping is a new technology based on Werner Pat. No. 4,761,077 and application by Stirling et al, Ser. No. 238,474.

Plant size units have been unable to achieve air to water volumetric ratios above 7.5 to 1, air limiting these devices to lower concentrations and easily stripped compounds or requiring multiple pass operation which is expensive to operate.

SUMMARY OF THE INVENTION

The present invention overcomes the above-named disadvantages of current air stripping processes by providing a compact and novel hydraulic jet apparatus wherein repeated compression and decompression, gas dissolution and flash evaporation, and heat of fluid friction increase the mass transfer rate for a given surface area and driving force. Substantial improvements in air entrainment, on the order of air to water ratios of 20:1, and surface area formation are embodied in the invention with integral impact coalescing for mist elimination.

DESCRIPTION OF THE PREFERRED EMBODIMENTS

Figures 1, 4, 5:
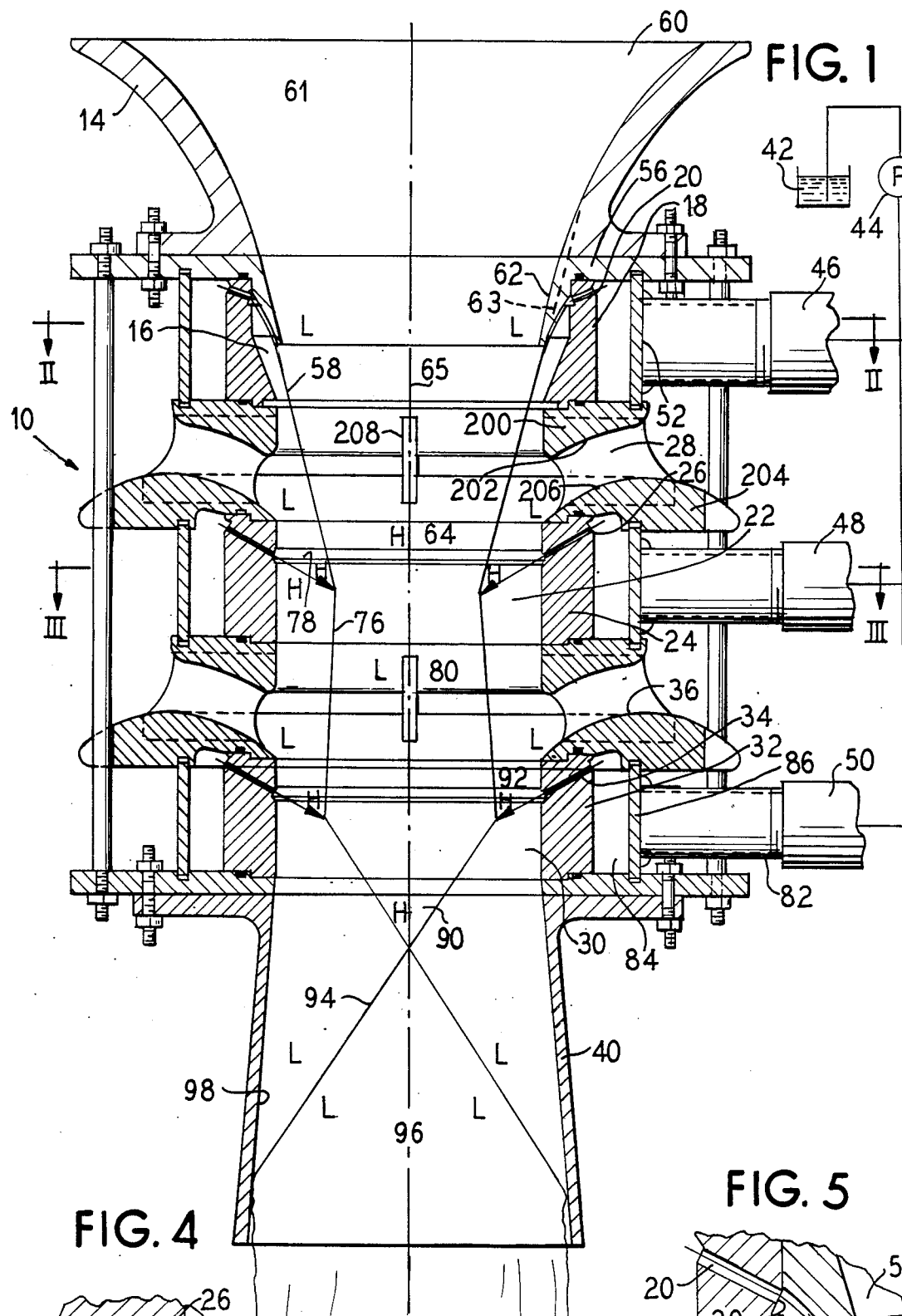
FIG. 1 is a side sectional view of a water conditioning apparatus of the present invention.
FIG. 4 is an enlarged partial sectional view of the water inlets in the second chamber.
FIG. 5 is an enlarged partial sectional view of a water inlet in the first chamber.

A water conditioning apparatus is shown generally at 10 in FIG. 1 and comprises a generally cylindrical body composed of a main air inlet 14, a first cylindrical chamber 16 defined by an annular wall 18 having a plurality of water inlets 20 formed therethrough, a second cylindrical chamber 22, spaced downstream of the first chamber 16 and also being formed of an annular wall 24 having a plurality of water inlets 26 therethrough, an annular air inlet 28 being positioned between the first chamber 16 and second chamber 22, a third cylindrical chamber 30 formed by an annular wall 32 having a plurality of water inlet passages 34 formed therethrough and being positioned downstream of the second chamber 22, there being an additional annular air inlet 36 spaced between the second and third chambers, and a frusto-conically shaped outlet tube 40 connected to the third chamber 30.

Raw water coming from a storage tank 42 or other source is moved under pressure by a pump 44 to a plurality of inlet conduits 46, 48, 50. The first inlet conduit 46 is secured to a tangential inlet passage 48 which communicates with an annular water distribution chamber 50 surrounding the annular wall 18 and being defined by an outer annular wall or jacket 52. The water distribution chamber 50 has a cross section dimension and aspect ratio in relation to the diameter of the tangential inlet 48 as to provide a fluid velocity ratio, between the inlet pipe velocity and chamber circumferential velocity, of less than 1.8 to 1.

Figure 2:
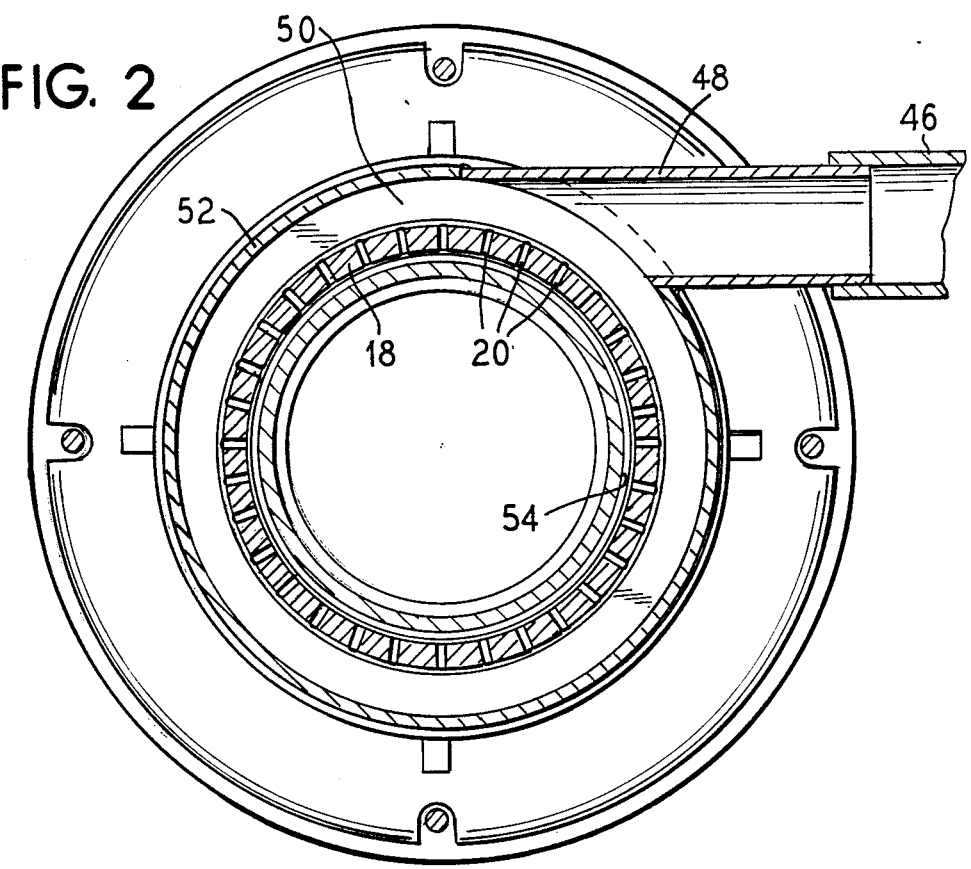
FIG. 2 is a sectional view taken generally along the lines II—II of FIG. 1 through the water inlets in a first chamber.

Raw water is distributed to a single row of the radially directed water inlet openings 20 provided in the annular wall 18 (FIG. 2). The openings 20 are aligned with a downwardly and inwardly curved surface 54 of a deflector plate 56 (FIG. 5). As raw water passes through the openings 20, it is flattened and sheared into an inverted cone 58 (FIG. 1). The deflector surface 54 is unique and provides a critical function in that hydraulic balancing is needed between the openings 20 due to the convex surface 54 the raw water is impacting on to prevent the exiting water from straightening and impacting the side of the chamber 16. The openings 20 have exit openings 20a positioned and directed to obtain a tangential impact of delivered raw water against the inner surface 54 of the deflector 56. The flow of water through the narrow jet forming openings 20 into the chamber 16 causes an aspiration of air through a large opening 60 of air inlet 14 due to formation of a low pressure zone 61 within the main air inlet 14. An interior surface 62 of the deflector plate 56 is shaped to cause a boundary layer air aspirated through opening 60 to attach to the raw water entering the first chamber 16 through the nozzles 20, increasing the entrainment of the air, thus increasing the quantity of aspirated air that intimately contacts the raw water. Preferably the deflector is constructed having the interior surface 62 conically shaped and the outside surface 54 has a curved shape decreasing in diameter until the cross sectional tangent 63 to the outside curve is fifteen degrees to a central axis 65 of the chamber 16. Applicant has determined that this shape will cause the water to shear and will direct the water to form the shape of the inverted cone 58 as described above.

Air is also aspirated through the annular air opening 28 positioned just downstream of the first chamber 16. The annular air inlet 28 is formed between an upper member 200 having a curved lower surface 202 and a lower member 204 having a curved upper surface 206, the upper and lower members being held apart by a plurality of spacers 208 such that a substantially annular air inlet opening is formed. The curved upper 206 and lower 202 surfaces converge towards one another such that the cross sectional area of the inlet 28 decreases in a radially inward direction to enhance a greater air flow into the apparatus. Thus, with air inlets on both ends of the first chamber 16, air is aspirated on both the inside and outside of the inverted cone spray 58. Shearing the raw water in this manner provides increased surface area and increased turbulence of the surface film. As the raw water moves toward the apex of its cone shape, the aspirated air inside the cone begins to compress. Being a continuous process, a compression zone 64 is formed in an area that the mixture of raw water and air passes through. Preferably, approximately 64% of the total raw water flow from the pump 44 is directed through the first conduit 46 and through the first chamber 16.

Figure 3:
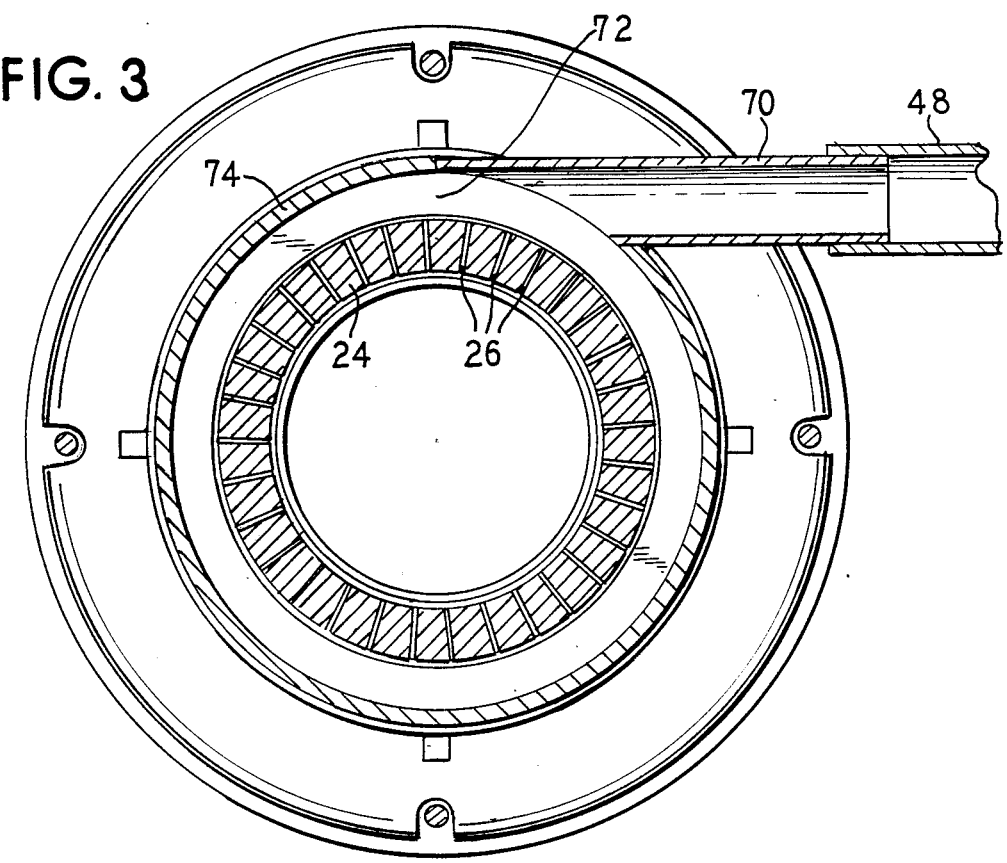
FIG. 3 is a sectional view taken generally along the lines III—III of FIG. 1, showing the water inlets in a second chamber.

A second flow of raw water is directed through conduit 48 to a tangential inlet 70 communicating with an annular raw water distribution chamber 72 defined between the annular wall 24 of the second chamber and an outer annular wall or jacket 74 (FIG. 3). As in chamber 1, raw water is distributed to a single row of the water inlets 26 which direct the water at high velocity in the form of jets to impact the shell of the cone 58 in a manner that maintains a controlled diverging tube shape 76 (FIG. 1). Preferably the jet inlets 26 are angled so as to impact the inverted cone shaped flow 58 at the longitudinal position where the pressure inside the cone is approximately two atmospheres. Since these jet inlets 26 are positioned adjacent to the air inlet 28, they also contribute to aspiration of air through inlet 28 and at the same time block the flow of air along the outside of the inverted cone shape 58 causing a donut shaped compression zone 78 to prevent the apex compression zone 64 from escaping. The diversion of the mixture stream in cone 76 creates a low pressure area 80 directly below the apex compression zone 64 and thus the mixture of air and water is decompressed at it passes through this zone 80. Preferably approximately 18% of the total raw water flow from the pump 44 is added in the second chamber 22.

The third and remaining portion of the raw water from the pump 44 is directed through the conduit 50 to a tangential inlet 82 which communicates with an annular raw water distribution chamber 84 defined by the annular wall 32 and an outer annular wall or jacket 86. Again, a single row of the nozzle shaped openings 34 are provided through the annular wall 32 which direct jets of raw water to impact the shell 76 of the air/water mixture. The jets are directed in a manner such that the diverging tube shape 76 is forced to collapse towards the center of the third chamber 30 creating another compression zone 90. These jets 34 are also located next to the air inlet 36 and aspirate the air creating a donut shaped compression zone 92 that tends to escape into the decompression zone 80 created by the second chamber 22. The momentum of the air/water mixture from its collapse drives it outward again at 94 in a diverging pattern creating a large decompression area 96 in the outlet tube 40. This diverging pattern creates more driving force for aspiration through the annular air inlet 36. The impact of this diverging flow with an interior side wall 98 of the outlet tube 40 coalesces much of the mist formed in the stripping process.

Preferably the inside surface 98 of the outlet tube 40 is smooth and angled five degrees from parallel to the longitudinal axis 65 of the apparatus so that as the momentum of the converged flow from the third chamber carries the flow to the diverging pattern 94, the flow impacts the side wall 98 of the tubular end piece 40 at an angle of less than twenty degrees causing coalescing of the now treated water and eliminating mist.

Although only a single third chamber is illustrated, additional chambers and connecting air inlets such as chamber 30 and inlet 36 can be added as desired to further enhance the stripping process as desired.

The stripping caused by the intimate mixing and large surface areas produced by this method and apparatus is increased by turbulence in the gas film and liquid film. The rapid and repeated compression and decompression in themselves cause turbulence in the gas/liquid films. The rapid change in the second chamber causes dissolved carbon dioxide to flash evaporate significantly increasing the turbulence levels at the film boundaries diffusing already stripped gases away from the boundaries resulting in an artificially high apparent driving force. Preliminary testing of a plant size prototype indicates a large reduction in air required to strip verses other methods possibly due to this change in apparent driving force.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. An apparatus for treating water comprising:
   an axially aligned series of stripping chambers;
   said stripping chambers comprising inlets for introducing raw water to be treated into said chambers;
   an atmospheric air inlet interposed between adjacent stripping chambers and at one end of said series of chambers; and
   an outlet connected at an opposite end of said series of chambers.

2. An apparatus according to claim 1, wherein said air inlets interposed between adjacent stripping chambers comprise annular inlets and said series of chambers comprises:
   a first cylindrical inlet chamber for introducing and shearing raw water and aspirating and mixing air with said sheared raw water;
   a second cylindrical chamber, connected to and separated from said first chamber by one of said air inlets, for introducing and directing raw water and aspirating air so as to impact the flow from said first chamber causing rapid pressure changes; and
   a third cylindrical chamber, connected to and separated from said second chamber by a further one of said air inlets, for introducing and directing raw water and aspirating air so as to impact the combined flow from said first and second chambers causing rapid pressure changes.

3. An apparatus according to claim 1, wherein said outlet is frusto-conically shaped and progressively increasing in diameter away from said chambers to form an impact area for coalescing droplets and an outlet for the combined flows of said stripping chambers.

4. An apparatus according to claim 2, wherein an outer jacket is provided to surround each stripping chamber to form a liquid receiving chamber from which raw water is introduced into said chambers.

5. An apparatus according to claim 2, wherein said first chamber includes an entrance piece conically shaped on its inside diameter and having a curved outside surface decreasing in diameter until the cross sectional tangent to the outside curve is fifteen degrees to an axial plane of the chamber, said outside surface being positioned relative to said raw water inlets so as to shear and direct the raw water in such a manner as to form a solid shell of sheared water in the shape of an inverted cone.

6. An apparatus according to claim 5, wherein said first stripping chamber has a single row of a plurality of said water inlet openings between said liquid receiving chamber and said stripping chamber directed toward the center of said chamber, said row of openings being positioned to obtain a tangential impact of delivered raw water with said outside surface of said entrance piece, such that said sheared water cone will entrain and aspirate air so as to create a low pressure area near a base of the inverted cone and a high pressure area inside an apex of the inverted cone.

7. An apparatus according to claim 1, wherein said air inlets positioned between each of said chambers comprise annular openings, each formed by a pair of curved entrance surfaces, said air inlets progressively decreasing in cross sectional area in a radially inward direction to obtain greater velocity air flow into said apparatus.

8. An apparatus according to claim 5, wherein said second chamber comprises a single row of a plurality of openings so angled as to impact said inverted cone shaped flow at a longitudinal position where the pressure inside the cone is equal to two atmospheres and in a manner as to form a high pressure area of air aspirated through said air inlet between the first and second chambers and as to diverge the inverted cone shaped flow forming a low pressure area within said diverging flow.

9. An apparatus according to claim 8, wherein said third chamber comprises a single row of a plurality of openings angled so that raw water flowing through them impacts the diverging flow from said second chamber to converge he combined flows and new aspirated air into the lower portion of the low pressure area, creating a high pressure area.

10. An apparatus according to claim 9, wherein said outlet has a smooth inside surface angled five degrees from parallel to the longitudinal axis of the apparatus where the momentum of said converged flow from said third chamber caries it to a diverging pattern to impact said inside surface of said outlet at an angle of less that twenty degrees causing coalescing of the now treated water and eliminating mist.

11. An apparatus according to claim 2, wherein said third chamber and connecting annular air inlet may be repeated as desired.

12. An apparatus for treating water comprising:
a supply of pressurized water requiring treatment;
an axially aligned series of at least three cylindrical stripping chambers with separate water inlets in each of said stripping chambers communicating with said water supply;
an annular atmospheric air inlet interposed between adjacent stripping chambers providing a radial communication path between said stripping chambers and atmosphere;
an axial atmospheric air inlet providing an axial communication path between a first of said chambers and atmosphere; and
an outlet communicating with a last of said chambers.

13. A method for treating water comprising:
pressurizing a supply of water requiring treatment;
directing a first portion of said water into a first stripping chamber under pressure so as to form a cone of spray within said stripping chamber;
aspirating atmospheric air into said first stripping chamber;
directing said cone of spray to a second stripping chamber;
directing a second portion of said water into said second stripping chamber under pressure so as to impinge upon and mix with said cone of spray;
aspirating atmospheric air directly into said second stripping chamber;
directing said cone of spray to a third stripping chamber;
directing a third portion of said water into said third stripping chamber under pressure so as to impinge upon and mix with said cone of spray;
aspirating atmospheric air directly into said third stripping chamber; and
directing said cone of spray against an interior annular wall of a discharge outlet to coalesce droplets of said spray.

* * * * *

UNITED STATES PATENT AND TRADEMARK OFFICE
CERTIFICATE OF CORRECTION

PATENT NO. : 4,954,147
DATED : September 4, 1990
INVENTOR(S) : RANDY A. GALGON

It is certified that error appears in the above—identified patent and that said Letters Patent is hereby corrected as shown below:

```
Column 6, line 3;
 Claim 10, line 6 "that" with --than-- in Column 6, line 3
       in the patent.
```

Signed and Sealed this

Twenty-sixth Day of October, 1993

Attest:

Attesting Officer

BRUCE LEHMAN

Commissioner of Patents and Trademarks